(12) United States Patent
Gibson

(10) Patent No.: US 6,209,027 B1
(45) Date of Patent: Mar. 27, 2001

(54) RECIRCULATING NETWORK ADDRESS LIST WITH SINGLE BUTTON SEQUENCER/SELECTOR

(75) Inventor: Kevin Patrick Gibson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/088,167

(22) Filed: Jun. 1, 1998

(51) Int. Cl.[7] .............................. G06F 15/57; G06F 13/38
(52) U.S. Cl. ................................................. 709/218; 707/10
(58) Field of Search ..................................... 709/217, 218, 709/227, 245; 707/513, 501, 10; 345/340, 341, 345, 346

(56) References Cited

U.S. PATENT DOCUMENTS

| | | | |
|---|---|---|---|
| 5,890,172 | * 3/1999 | Borman et al. | 707/501 |
| 5,917,491 | * 6/1999 | Bauersfeld | 345/352 |
| 5,918,237 | * 6/1999 | Montalbano | 707/513 |
| 5,937,163 | * 8/1999 | Lee et al. | 709/218 |
| 5,958,013 | * 9/1999 | King et al. | 709/227 |
| 5,963,964 | * 10/1999 | Nielsen | 707/501 |
| 5,974,443 | * 10/1999 | Jeske | 709/202 |
| 5,978,828 | * 11/1999 | Greer et al. | 709/224 |
| 5,987,466 | * 11/1999 | Greer et al. | 707/10 |
| 5,991,760 | * 11/1999 | Gauvin et al. | 707/10 |
| 5,991,798 | * 11/1999 | Ozaki et al. | 709/217 |
| 6,028,600 | * 2/2000 | Rosin et al. | 345/327 |
| 6,032,162 | * 2/2000 | Burke | 707/501 |
| 6,041,360 | * 3/2000 | Himmel et al. | 709/245 |
| 6,043,816 | * 3/2000 | Williams et al. | 345/340 |

* cited by examiner

Primary Examiner—Le Hien Luu
Assistant Examiner—Bunjob Jaroenchonwanit
(74) Attorney, Agent, or Firm—Felsman, Bradley, Vaden, Gunter & Dillon (57) ABSTRACT

An improved method and system for selecting, retrieving and managing access to computer network locations. The method improves access to frequently utilized network locations by providing a recirculating list of network addresses selectable by a single user input. A user interface to the computer network can be accomplished utilizing a network browser in cooperation with a personal computer. The recirculating list of frequently utilized network locations is entered by the user into the system. The recirculating list has a selectable network location which is displayed to the user. The selectable network location can be requested and retrieved by a single user input such as selecting an icon which resides on a toolbar. The information or data associated with the selectable network location is automatically displayed in response to the user selecting the active URL of the recirculating list. The selectable network address can be accessed by a user in response to a single user input. After the single user input selects the active URL of the recirculating list the next URL becomes the active URL such that the user can efficiently select the next available selection. The list is recirculated such that a list of frequently accessed network locations can be efficiently managed and selected utilizing a single user input in cooperation with the recirculating list.

18 Claims, 7 Drawing Sheets

RECIRCULATING NETWORK ADDRESS LIST WITH SINGLE BUTTON SEQUENCER/SELECTOR

BACKGROUND OF THE INVENTION

1. Technical Field

The present invention relates in general to an improved method for efficient information retrieval in data processing systems and in particular to an efficient method for managing access to frequently utilized network sites such that the user can access a sequence of predetermined network locations utilizing a single user input. Still more particularly, the present invention relates to a recirculating list of frequently utilized addresses which can be scrolled and selected utilizing a single user input.

2. Description of the Related Art

The development of computerized information resources, such as interconnection of remote computer networks, allows users of dataprocessing systems to link with other "servers" and networks, and thus retrieve vast amounts of electronic information heretofore unavailable in an electronic medium. A server provides interconnection among communicating networks. Such electronic information is increasingly displacing more conventional means of information transmission, such as newspapers, magazines, and even television. Often, users desire quick access to specific information on a re-occurring basis. It is therefore desirable to maximize efficiency and minimize complexity when retrieving information from predetermined locations utilizing a computer.

In computer communications, a set of computer networks which are possibly dissimilar from one another are joined together by "gateways". Gateways provide data transfer and conversion of messages from the sending network to the protocols and data type utilized by the receiving network. A gateway is a device utilized to connect dissimilar networks or, networks utilizing different communication protocols, such that electronic information utilizing different standards can be processed and transmitted from network to network. Gateways convert information to a form compatible with the protocols utilized by other networks for transport and delivery.

One type of remote network commonly utilized in recent years is the Internet. The term "Internet" is an abbreviation for "Internetwork," and is commonly utilized to describe the collection of networks and gateways which are compatible with the TCP/IP suite of protocols. TCP/IP protocols are well-known in the art of computer networking. TCP/IP is an acronym for "Transmission Control Protocol/Internet Protocol," a software protocol developed by the Department of Defense for communication between computers. The Internet can be described as a system of geographically distributed remote computer networks interconnected by computers which provide an interface that allow users to interact and share information over the networks. Because of such wide-spread information sharing, remote networks such as the Internet have thus far generally evolved into an "extensive" system which developers can provide information or services, essentially without restriction.

Electronic information transferred between dataprocessing networks is usually presented in "hypertext", a metaphor for presenting information in a manner in which text, images, sounds, and actions become linked together in a complex non-sequential "web" of associations. The web of associations permits a user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface, in a dataprocessing system, might lead the user to the periodic table of the chemical elements (i.e., linked by the word "iron"), or to a reference to the utilization of iron in weapons in Europe in the Dark Ages. The term "hypertext" was coined in the 1960s to describe documents, as presented by a computer, that express the nonlinear structure of ideas, as opposed to the linear format of books, film, and speech. The term "hypermedia," on the other hand, more recently introduced, is nearly synonymous with "hypertext," but focuses on the non-textual components of hypertext, such as animation, recorded sound, and video.

A typical networked system which utilizes hypertext and hypermedia conventions follows a client/server architecture. The "client" is a member of a class or group that utilizes the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by a server (i.e., another computer).

A request for information by a user is sent by a client application program to a server. A server is typically a remote computer system accessible over a remote network, such as the Internet. The server scans and searches for raw (e.g., unprocessed) information sources, for example, newswire feeds or newsgroups. Based upon the user's request, the server presents filtered electronic information as a server response to the client process. The client process may be active in a first computer system, and the server process may be active in a second computer system. The client and server communicate with one another over a communications medium, thus providing distributed functionality and allowing multiple clients to take advantage of the information-gathering capabilities of a single server.

Free or relatively inexpensive computer software applications, such as Internet "search engines," allow a user to locate sites where an individual can obtain information on a topic of interest. A person utilizing a graphical user interface of a computer system may enter a subject or key word which generates a list of network sites (i.e., web sites). Thus, with "home pages" published by thousands of companies, universities, government agencies, museums, and municipalities, the Internet can be an invaluable information resource.

A client and server can communicate with one another utilizing the functionality provided by Hypertext-Transfer Protocol (HTTP). The World Wide Web (WWW) or, simply, the "web," includes those servers adhering to this standard (i.e., HTTP) which are accessible to clients via a computer or data-processing system network address, such as a Universal Resource Locator (URL). A network location can be directly accessed by utilizing a Universal Resource Locator address.

Active within the client is a first process, known as a "browser," which establishes the connection between the client and the server and presents information to the user on a graphical user interface. The server itself executes corresponding server software which presents information to the client in the form of HTTP responses. The HTTP responses correspond to "web pages" constructed from a Hypertext Markup Language (HTML), or other server-generated data. A client and a server may be coupled to one another via a Serial Line Internet Protocol (SLIP) or TCP/IP connections for high-capacity communication.

Generally, a client displays a browser and data received from the network via a graphical user interface. A graphical user interface is a type of display format that enables a user to choose commands, start programs, and see lists of files and other options by pointing to pictorial representations (icons or selectable buttons) and/or lists of menu items on the display. User selections are generally activated either with a keyboard or a mouse.

A graphical user interface (GUI) can be employed by a user to start processes, view file content and to select tools. Additionally, a GUI allows a user to command many selectable tools by pointing to a desired selection and depressing a push button typically utilizing a mouse. A desired selection might be a textual reference, a toolbar button, or a selection from a list of menu items on a computer display screen.

A user selectable choice can generally be activated by either a keyboard or a push button switch located on a pointing device, such as a mouse. A mouse is a commonly utilized pointing device, generally containing more than one button. A pointing device allows a user to interact with a product or operating environment, such as a graphical user interface. In many graphical user interfaces, a vertical or horizontal bar at the side, bottom or top of a graphical user interface window can be utilized in conjunction with a pointing device, such as a mouse, trackball, or stylus to quickly select features of the application program.

Additional vertical and horizontal bars may contain "selectable buttons." Selectable buttons are commonly called "icons" by those familiar with graphical user interfaces. An icon is a selectable button viewable within a graphical user interface, typically containing a pictorial representation or a mnemonic of a selectable feature.

Generally, the pictorial representation contained within an icon is a graphic symbol allowing a user to associate an icon with a particular selectable function. An icon can be selected by pointing to the icon utilizing a pointing device and activating a push-button on the mouse when the icon is pointed to. Pointing to a selection and depressing a mouse button is commonly referred to by those having skill in the art as "pointing and clicking" on the icon or on the menu item. Pointing and clicking is a user friendly way to select a particular function or software application. Generally, an icon contains a visual mnemonic which allows a user to identify a selection without having to remember commands or type in commands utilizing a keyboard as is required in a disk operating system (DOS) environment.

Horizontal or vertical bars containing textual menu category headings are commonly referred to as menu bars. Horizontal or vertical bars containing icons are commonly referred to as toolbars. Toolbars are a well known part of graphical user interfaces which simplify access to files and allow the user to perform complicated system commands by pointing and clicking on a selectable item within the graphical user interface. Toolbar selectable user commands provide efficient interface between the user and a computer system. Often, user selectable commands located on a toolbar are duplicated in the menu bar.

It is easier and more efficient to activate selections within a toolbar than to locate and select menu headings and corresponding menu items. Menu items and sub-menu items are not continuously displayed and a menu heading must be selected to view a list of menu items contained under the menu heading.

Individual users utilize a networked computer to retrieve different information due to each individual's diverse interests in information. Different users also have different informational requirements. It is often difficult to locate a desirable information resource, or web page, and locating a pertinent resource can consume a substantial amount of time. Locating an information resource is typically done by keyword searching. Keyword searching is accomplished when a user provides a keyword and instructs the client via a server to search for information resources having the keyword or information resources linked to the keyword. Typically, the user receives voluminous information from the internet when a keyword search is performed. Next, the user must sort through the received information for desirable data.

Web pages or network locations can also be accessed by a client which specifies a unique network address (i.e., Universal Resource Locator). A Universal Resource Locator has two basic components, the protocol to be utilized and the object pathname. For example, the Universal Resource Locator address, with the pefix "http://" and the body "www,uspt.gov" is the home page for the U.S. Patent and Trademark Office. This address specifies a hypertext-transfer protocol ("http") and a pathname of the server ("www.uspto.gov"). The server name is associated with a unique numeric value (TCP/IP address).

The graphical portion of the World Wide Web itself is usually stocked with more than twenty-two million "pages" of content, with over one million new pages added every month. With a little practice, a user can skim millions of web pages or thousands of newsgroups, not only for topics of general interest, but also to access desirable and meaningful data. However, locating and scanning web pages can consume hours and hours of a users time. The market for Internet access and related applications is explosive and utilization of the Internet is growing faster than expected, doubling in size approximately every three months. Because of the growth of the "Internet" and the so-called "World Wide Web" in recent years, the amount of data which must be screened to get desirable data is overwhelming.

In order to avoid the inefficiencies of relocating a resource after it is has been initially located, a "bookmark" or "hotlist" function is typically offered as part of the graphical user interface within a web browser application. Generally, a bookmark is a universal resource locator address which is stored by the browser. When a bookmark is selected, the corresponding URL address is sent to a server by a client, then the desired location is accessed and corresponding information is retrieved efficiently with minimal user input and effort.

A typical user stores a considerable quantity of bookmark locations. However, limited space is available on the computer display to display bookmarks. Typically, a user places bookmark locations in folders, menus and sub-menus. Locating bookmarks in folders, menus and/or sub-menus complicates bookmark access. Additionally, many users have particular network locations which they desire to visit on a regular basis and management of access to the desired locations for information gathering would also be advantageous.

For example, an investor in the stock market might want to ensure he visits an investors advisory location, a location having information on how foreign markets closed and any comments made by the Federal Reserve Chairman on a daily basis. An automated system for quickly and directly accessing related information resources and controlling or ensuring a specific access routine would be highly desirable. Accessing, and tracking the access of all desired bookmark or hotlist locations is an inefficient process. Management of a daily list of URLs currently must be done manually.

Currently, bookmark or hotlist features require the user to click on the menu item entitled "bookmark" or "hotlist" to display pull down menus containing folders or URLs. To select a bookmark location, the user must traverse the pull down menu with the mouse button depressed and select a menu item in the pull down menu, such as a folder. Next, the folder must be selected and opened, and finally a URL address or bookmark must be selected. Minimal user input would be desirable to efficiently select frequently utilized locations and to provide a user friendly interface.

Currently, bookmark or hotlist utilization in browser programs requires opening files and performing multiple steps, such as selecting through a series of menu or sub-menu items to activate a bookmark. With known graphical user interfaces, each time a folder within a sub-menu is selected, which is listed under a menu heading, user precision is required to highlight the menu heading, traverse the newly displayed sub-menu items while keeping the mouse button depressed, and then releasing the mouse button or double clicking the mouse button on the desired selection. A computer operator is required to perform abrupt changes in the motion of the mouse in coordination with a mouse button to select a concealed menu item that resides within a folder. During menu item selection, a user cannot be clumsy or inattentive, because a menu item selection might be made which was not desired.

A sub-menu item is typically less than quarter of an inch in height on a typical display or monitor. Therefore, substantial dexterity is required to traverse menus and select desired menu items utilizing a pointing device, further coordinated with mouse button activation. In contrast, items within a toolbar or a single pull down menu do not require a series of activations and user inputs, such as traversing menus and/or traversing of sub-menus. Erroneous menu selections results when a user over-shoots his intended menu item selection by only a fraction of an inch.

Based on the foregoing it can be seen that a need exists for fast and efficient access to frequently utilized web sites. It would, therefore, be desirable to devise a method of minimal complexity which allows users to efficiently command a computer to access frequently utilized computer network locations. It would be further advantageous to devise a method to allow a user to manage a sequential list of networks locations such that the user can determine if he has visited all locations within the list. Additionally, it would be advantageous if the method would retain current toolbar behavior, but extend user functionality and decrease visual complexity.

SUMMARY OF THE INVENTION

It is therefore one object of the present invention to provide an improved method for efficient information retrieval in a data processing systems.

It is another object of the present invention to provide an efficient method for managing access to frequently utilized network sites such that the user can access a sequence of predetermined network locations utilizing a single user input.

It is yet another object of the present invention to provide a recirculating list of frequently utilized addresses which can be scrolled and selected utilizing a single user input.

The foregoing objects are achieved as is now described. An improved method and system for selecting, retrieving and managing access to computer network locations is provided. The method improves access to frequently utilized network locations by providing a recirculating list of network addresses selectable by a single user input. A user interface to the computer network can be accomplished utilizing a network browser in cooperation with a personal computer. The recirculating list of frequently utilized network locations is entered by the user into the system. The recirculating list has a selectable network location which is displayed to the user. The selectable network location can be requested and retrieved by a single user input such as selecting an icon which resides on a toolbar. The information or data associated with the selectable network location is automatically displayed in response to the user selecting the active URL of the recirculating list. The selectable network address can be accessed by a user in response to a single user input. After the single user input selects the active URL of the recirculating list the next URL becomes the active URL such that the user can efficiently select the next available selection. The list is recirculated such that a list of frequently accessed network locations can be efficiently managed and selected utilizing a single user input in cooperation with the recirculating list.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
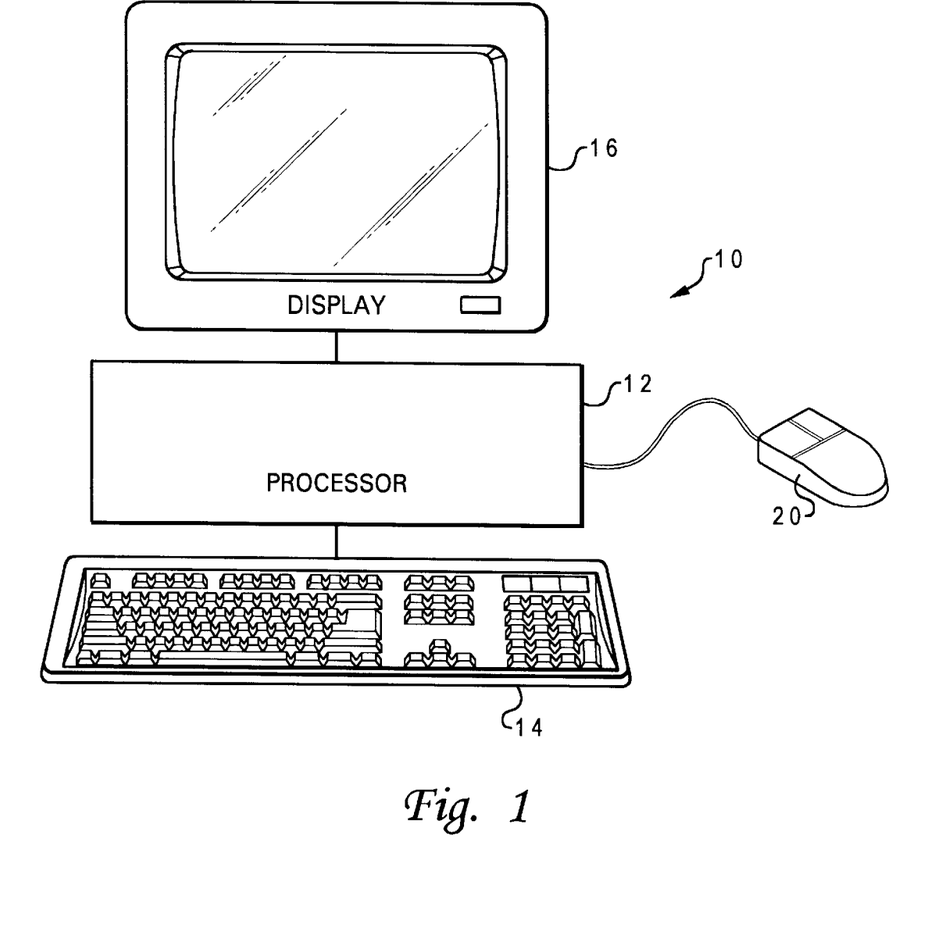
FIG. 1 is a pictorial representation of an exemplary data processing system implementing the method and system of the present invention.

With reference now to the figures and in particular with reference to FIG. 1, there is depicted a pictorial representation of a data-processing system in which a preferred embodiment of the present invention is implemented. A computer 10 is depicted which includes a system unit 12, video display terminal 16, alphanumeric input device (i.e., keyboard 14) having alphanumeric and other keys, and mouse 20. An additional input device (not shown), such as a trackball or stylus, (not shown) also can be included with computer 10.

Computer 10 can be implemented utilizing any suitable computer, such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data processing systems, such as intelligent workstations or minicomputers. Computer 10 also preferably includes a graphical user interface that resides within a machine-readable media to direct the operation and user interface of computer 10. Computer 10 also can be implemented utilizing any suitable computer, such as the IBM RISC/6000 computer, also a product of International Business Machines Corporation, located in Armonk, N.Y. "RISC SYSTEM/6000" is a trademark of International Business Machines Corporation, and also can be referred to as the "RS/6000."

Figure 2:
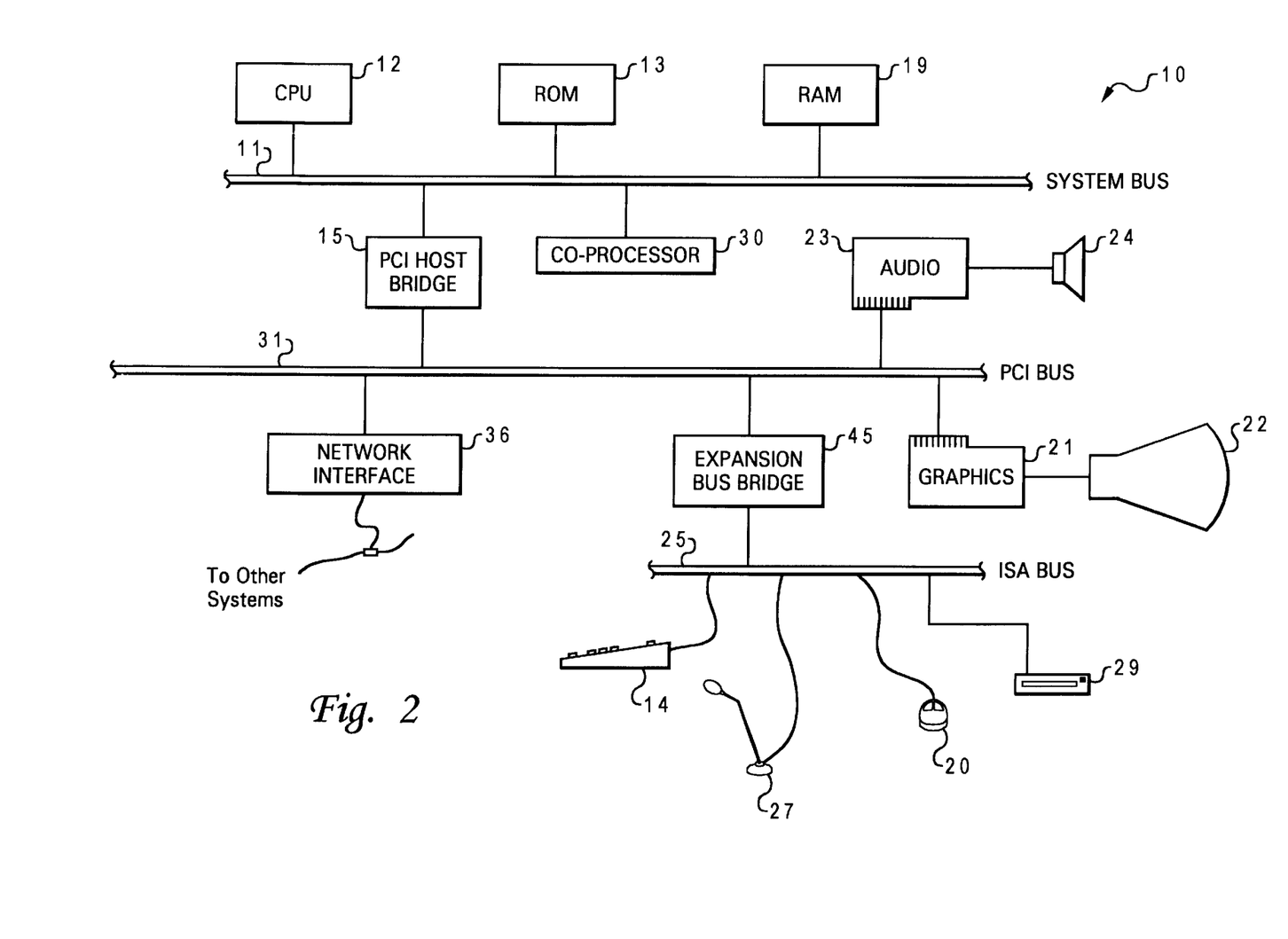
FIG. 2 depicts a block diagram illustrative of selected components of a data processing system or a personal computer system in accordance with the method and system of the present invention.

Referring now to FIG. 2, there is depicted a block diagram of selected components in accordance with computer 10 of FIG. 1. A preferred embodiment of the present invention may be implemented with the system architectures of FIG. 2. Computer 10 preferably includes a system bus 11. System bus 11 is utilized for interconnecting and establishing communication between various components within computer 10. Microprocessor or central processing unit (CPU) 12 is connected to system bus 11 and also may have numeric co-processor 30 connected to it. Read-only memory ("ROM") 13 and random-access memory ("RAM") 19 are also connected to system bus 11. ROM 13 is mapped into CPU 12 address space in the range from 640K to 1 megabyte. RAM 19 is attached to system bus 11 and contains system-configuration information. Any suitable machine-readable media may retain an application program, such as a graphical user interface, a browser within computer 10, such as RAM 19, ROM 13, a magnetic diskette, magnetic tape, or optical disk.

Also connected to system bus 11 is PCI host bridge 15 which couples system bus 11 to PCI bus 31. PCI host bridge 15 controls the flow of data between PCI bus 31 and various peripherals, adapters, and devices. Expansion bridge bus 45 controls the flow of data from PCI bus 31 to ISA bus 25. ISA bus 25 couples various I/O devices to computer 10. I/O devices include keyboard 14, mouse 20, disk drive 29 and microphone 27. Keyboard 14, mouse 20 and disk drive 29 typically have controllers (not shown) which are utilized to interface ISA bus 25. Video controller 21 provides a hardware interface for video display terminal 22. Audio controller 23 provides a hardware interface for speaker 24.

A network interface adapter 36 additionally can be connected to PCI bus 31 in order to link computer 10 to other data-processing system networks in a client/server architecture or to groups of computers and associated devices which are connected by communications facilities (not shown).

Figure 3:
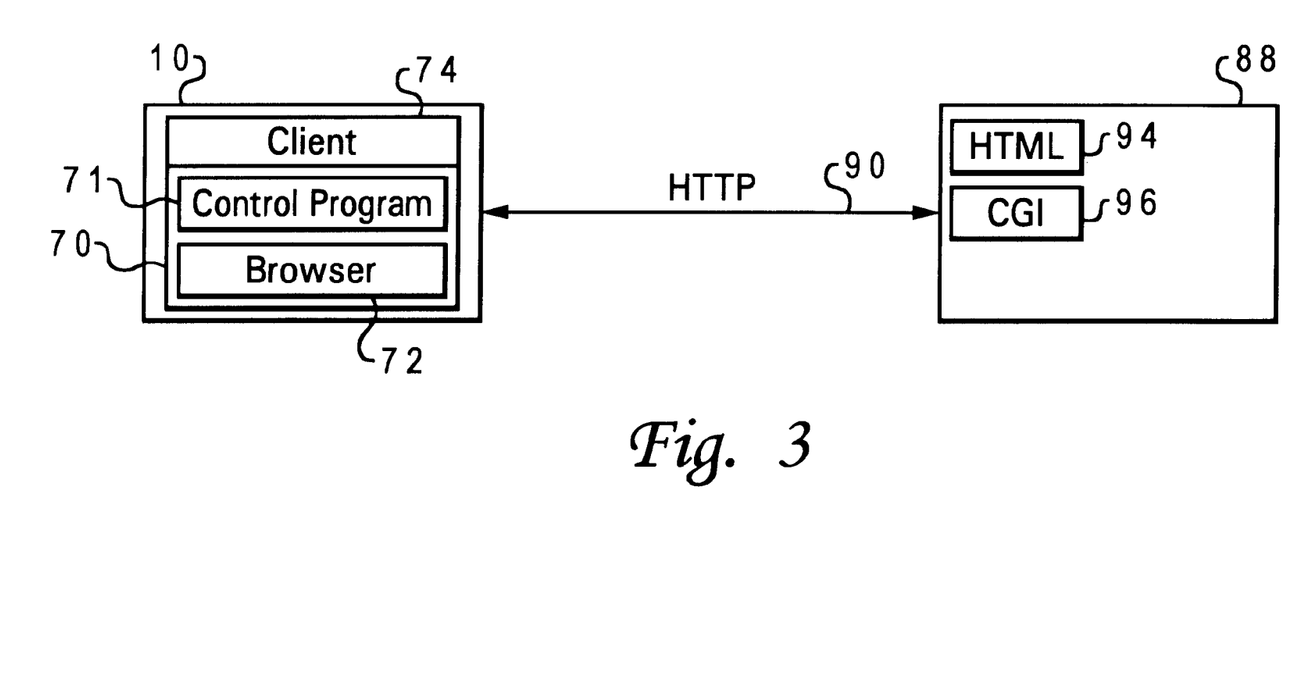
FIG. 3 is illustrative of a client server relationship including a client implementing the method and system of the present invention.

FIG. 3 illustrates a block diagram illustrative of a client/server architecture including exemplary control program and browser components in accordance with the method and system of the present invention. In FIG. 3, user requests for information are sent by client 74 via computer 10 in cooperation with an application program, such as browser 72 to server 88. Server 88 can be a remote computer system accessible over a communication line 90 or a remote network, such as the Internet. Server 88 performs scanning and searching of raw or unprocessed information sources, such as newswire feeds or newsgroups and, based upon these user requests, the server presents filtered electronic information as a server response over communication link 90 to the client process.

The client process may be active in a first computer system, and the server process may be active in a second computer system. The server process communicates with the first computer system over a communications medium, such as communication line 90 thus providing distributed functionality and allowing multiple clients to take advantage of the information gathering capabilities of a single server located miles away.

In a preferred embodiment, computer 10 and server 88 communicate utilizing the functionality provided by HTTP. Active within computer 10 is a first process, browser 72, which establishes the connections with server 88, and presents information to the user via a graphical user interface. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser™, Explorer™ or the Lynx-brand browsers which provide the functionality specified under HTTP can also be utilized with a preferred embodiment of the present invention.

Server 88 executes the corresponding server software which presents information to client software in the form of HTTP responses. HTTP responses correspond with "web pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. A client program may include a search engine which scans received information in server 88 for presentation to the user via client 74.

Utilizing a browser interface, and HTTP responses, server 88 may notify client 74 of the results of an execution upon completion. Common Gateway Interlace (CGI) 96 is one form of a "gateway," a device utilized to adapt data for utilization by dissimilar networks (i.e., networks utilizing different communication protocols), such that electronic information in different forms can be passed from one network to another. Gateways transfer electronic information, converting such information to a form compatible with the protocols utilized by a second network for transport and delivery.

Software application programs residing in main memory 70 are accessible by CPU 12 via system bus 11 of computer 10 described in FIG. 2. Applications in main memory include control program 71. Control program 71 contains instructions that when executed on a CPU carries out computations as a computer program product. The computer program product can also be referred to as a program product. Control program 71 can support a number of Internet-access tools including, for example, an HTTP-compliant web "browser." Known browser software applications include: Netscape Navigators® ("Netscape"), Mosaic™, Microsoft Explorer™, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Ill., and Explorer is available from Microsoft Corp. However, the present invention can be utilized with any web browser or any developing web browser.

Control program 71 can support other remote network services, such as a file-transfer protocol (FTP) service, which facilitates the transfer and sharing of files across remote networks, such as the Internet. Control program 71 can further support remote network services, such as remote terminal access (Telnet), which allows users to log onto computers coupled to the network. In addition, control program 71 can support services, such as simple mail-transfer protocol (SMTP), or e-mail, and network news-transfer protocol (NNTP) or "Usenet," all of these network services are well-known in the art of computer networking.

It is important to note that, while the present invention has been, and will continue to be described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include recordable-type media, such as floppy disks, hard-disk drives, audio CDs and CD ROMs, and transmission-type media, such as digital and analog communication links.

Those skilled in the art will appreciate that the hardware depicted in FIGS. 1 and 2 may vary for specific applications. For example, other peripheral devices, such as optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated by those having skill in the art that any configuration of the aforementioned system and any future, yet to be developed, configuration may be utilized to implement the present invention.

Figure 4:
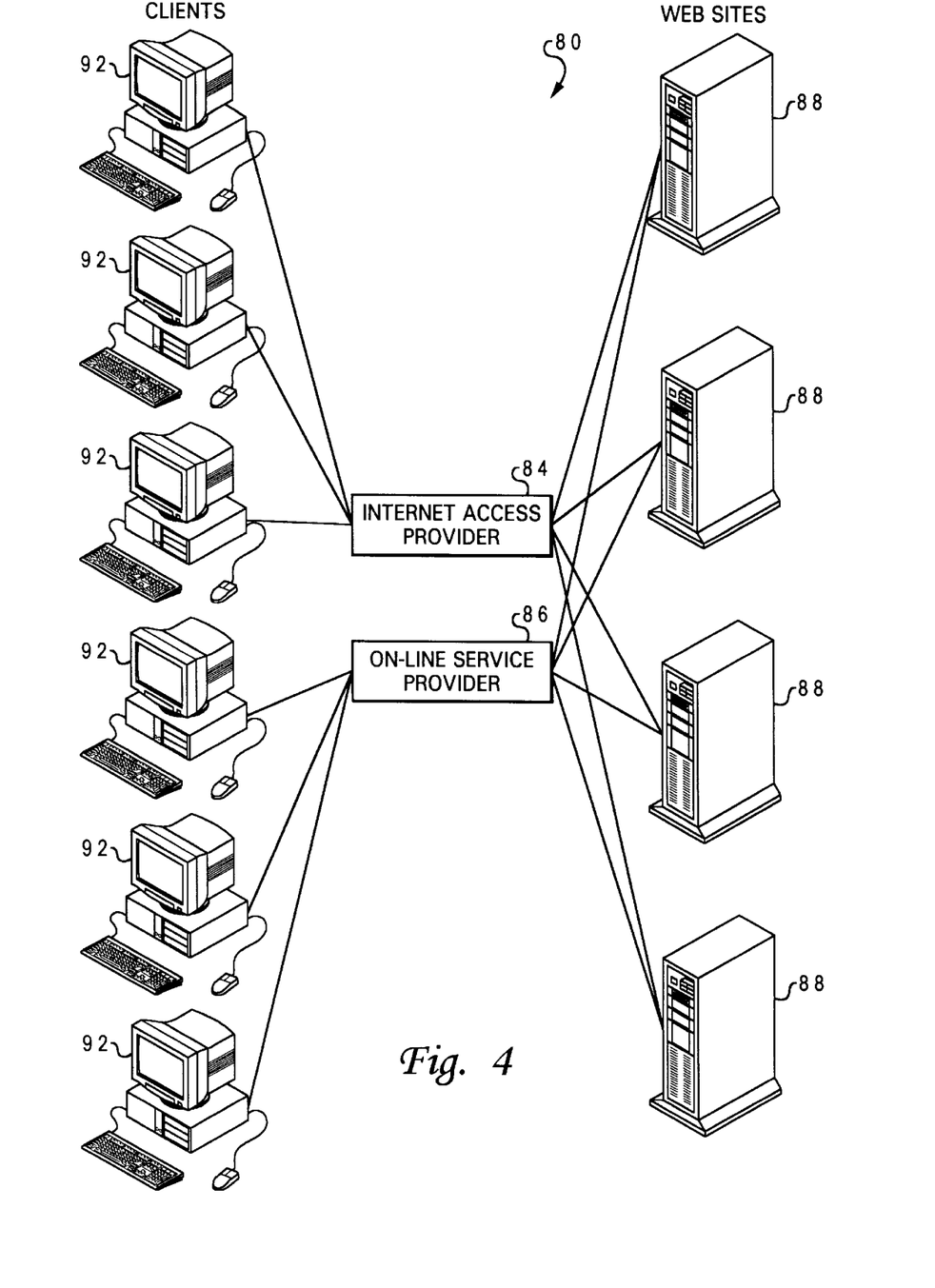
FIG. 4 depicts an internet configuration including a client implementing method and system of the present invention.

Referring to FIG. 4 an illustration of an exemplary computer network 80 is depicted in which the method and system of the present invention is implemented. Computer network 80 is representative of a remote network, specifically the Internet, a known computer network based on the client-server model discussed earlier. Conceptually, the Internet includes a large network of servers 88 which are accessible by users of personal computers or clients 92 also. Personal computers typically access a server via a private Internet-access provider 84 (e.g., such as Internet America™) or an on-line service provider 86 (e.g., such as America On-Line™, Prodigy™, Compuserve™, and the like). Each of the clients 92 may run a browser, a known software tool utilized to access server 88 via access providers 84. Server 88 operates a web site which supports files in the form of documents and pages. A network path to servers 88 is identified by a Universal Resource Locator (URL) having a known syntax for defining a network collection. Again, FIGS. 3 and 4 are merely illustrative and it can be appreciated by those having skill in the art that any working configuration or future configuration can be utilized to implement the present invention. New communication configurations or interconnect configurations will not part from the scope of the present invention.

Figure 5:
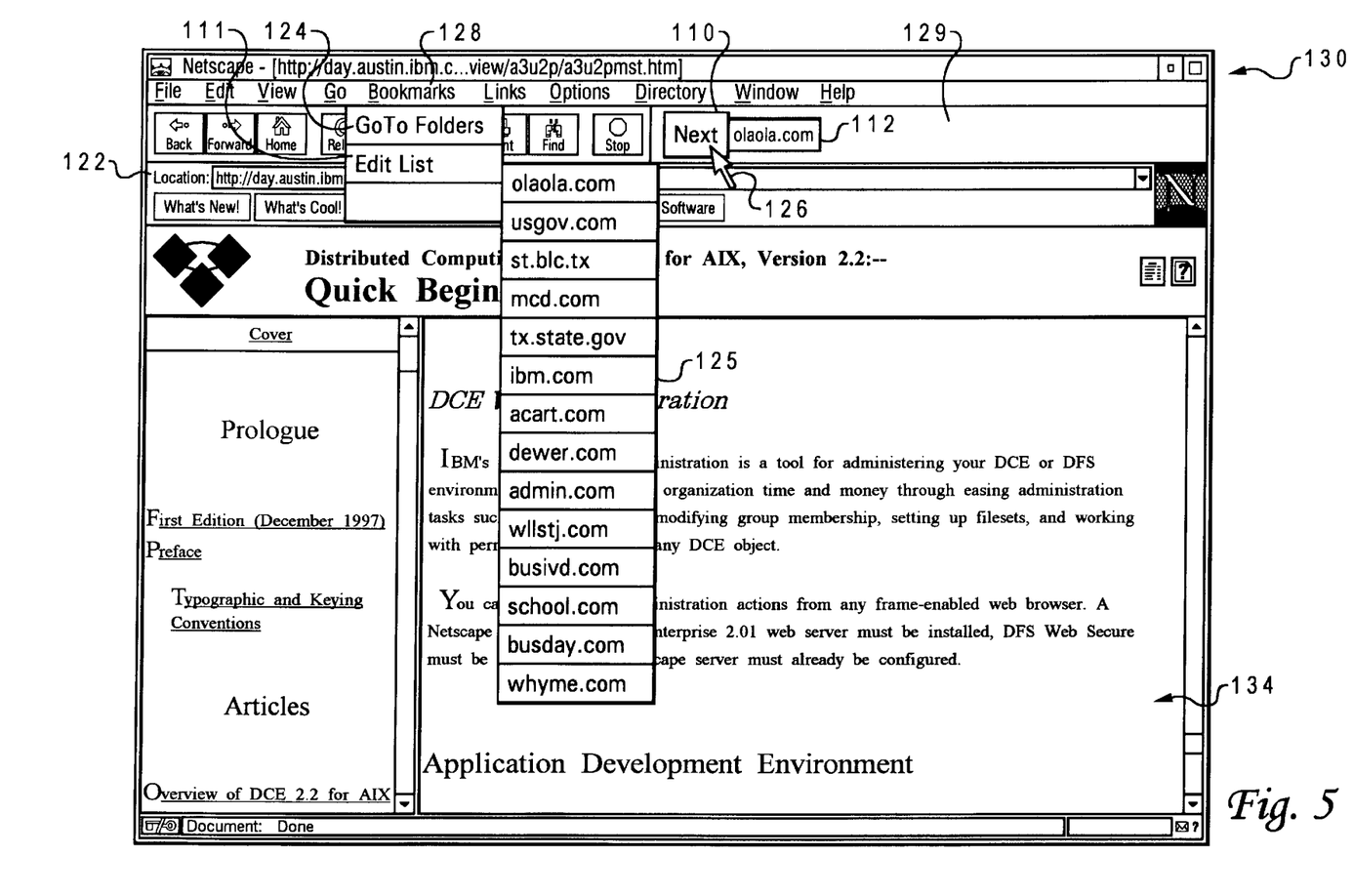
FIG. 5 depicts a hypertext document contained within a graphical user interface window which illustrates an implementation of a method and system in accordance with a preferred embodiment of the present invention.

FIG. 5 depicts a graphical user interface window in a web browser 130 in accordance with a method and system of the present invention. In the embodiment depicted in FIG. 5, document 134 is displayed within a browser developed and marketed by Netscape™. However, utilization of the present invention is not limited to any specific browser and the browser depicted FIG. 5 is merely for exemplary purposes.

Document 134 represents an information resource which a user may desire to retrieve on a re-occurring basis. The present invention provides a recirculating list 125 from which a single selection from the list can be directly accessed by a single user input.

For example, if pointing device 126 is within the visual boundary of Next selectable icon 110, a user can depress a pointing device button or "click on" Next selectable icon 110 and the selectable URL address displayed in box 112 will automatically be retrieved and its contents will be displayed by the browser. After retrieval of the selected URL address, the retrieved URL address is placed at the bottom of recirculating list 125 and the next selectable URL address from the top of recirculating list 125 is automatically circulate to box 112 to provide a new selectable URL address. After all of the addresses in recirculating list 125 have been selected, the initial selection again returns to the be displayed in box 112, hence, the URL list is referred to as a recirculating list.

It is preferred that a means for accessing recirculating list 125 is always displayed. It is also preferred that only one URL selectable address of the recirculating list is displayed for selection, thereby requiring only a single user input to access web sites having URL addresses in the recirculating list.

Selecting Next selectable icon 110 to access the active URL address in box 112 allows the client to immediately send instructions to a server to retrieve the data associated with the selected address location. Next selectable icon 110 allows a user to access an information resource quickly by placing pointing device 126 on Next selectable icon 110 and entering a user input, such as depressing or "clicking" a mouse button.

"Pointing and clicking" on Next selectable icon 110 allows the graphical user interface to immediately access and retrieved information associated with the active address location displayed in box 112. The active address location is the selectable address of the recirculating list. Those skilled in the art will appreciate the efficiency of "pointing and clicking" with a mouse or other pointing device on an icon associated with a URL address, to automatically retrieve a web page.

The recirculating list iterates URLs which are arranged in a stacked configuration having a top and a bottom location or position. After the URL at the top of the list or in the selectable position is selected, it returns to the bottom of the list. Recirculating list 125 can require the user to visit a plurality of designated web sites in order. Alternately, recirculating list 125 allows a user to manage or track his or her access to a group of desired web sites.

Creation of a recirculating list could be preformed by accessing bookmark pulldown menu 128 and selecting an icon or menu item such as edit list 111. Edit list 111 menu item would allow a user to add or move existing URL addresses into recirculating list 125 and control the order of recirculating list 125. Many different methods could be utilized to create and edit a recirculating list without departing from the scope of the present invention. Additionally, a folder (not shown) within bookmark pulldown menu 128 could be labeled "recirculating list" and URL addresses could be placed in an order within the recirculating list folder.

In accordance with one embodiment of the present invention, after selection of an active web site the recirculating list automatically displays the next selectable URL as the selectable URL in box 112. Therefore, cycling through the entire list of the present invention is pseudo-mandatory. Pseudo-mandatory circulation of recirculating list 125 prevents a user from forgetting to visit an information resource location which might contain important information. Pseudo-mandatory circulation can be accomplished with a single button on toolbar 129 and auto circulation is accomplished responsive to the single user input. Specifically, selecting Next selectable icon 110 proves single input selection for an entire list in a predetermined order.

It is preferred that at the end of a session or when a user exits the browser, the user is provided with an opportunity to select whether to start the next session where the present one has been terminated (i.e. resume at the same location in the list where the current session has left off) or to resume the next session with the URL which was utilized in the initial user request to the server.

Clicking on bookmark pulldown menu 128 allows the graphical user interface to display menu selections associated with bookmark pulldown menu 128. Those skilled in the art will appreciate that "clicking" with a mouse or other pointing device on a URL address within bookmark pulldown menu 128 will automatically retrieve the web page associated with the selected URL address.

Figure 6:
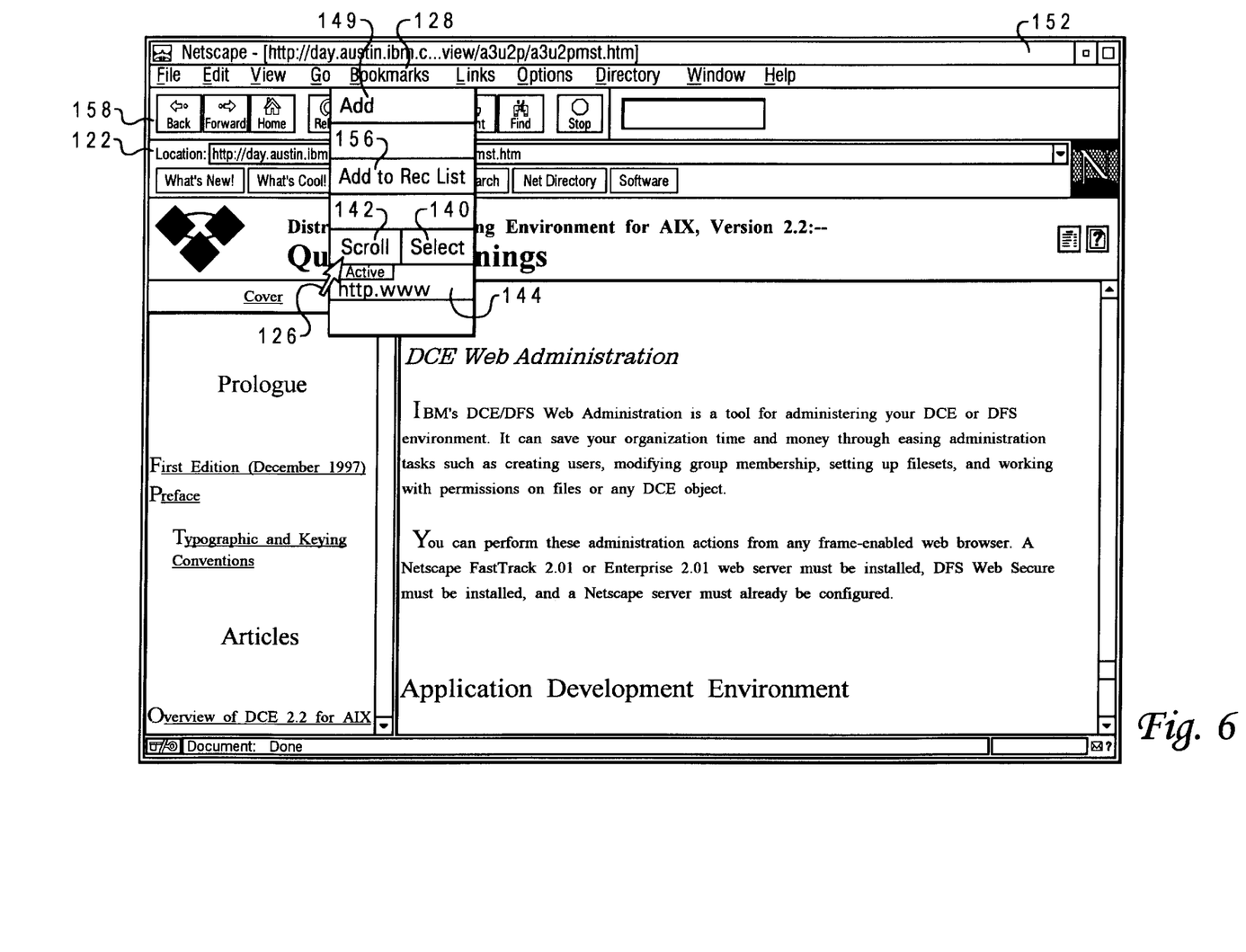
FIG. 6 depicts a hypertext document contained within a graphical user interface window which illustrates an implementation of a method and system in accordance with a preferred embodiment of the present invention.

Referring to FIG. 6, an alternate embodiment which does not require pseudo-mandatory circulation of a recirculating list is depicted. In this embodiment selectable scroll button 142, select button 140 and add to rec list button 156 are depicted. One method which can be utilized to add a URL to the recirculating list is to store the location of the currently displayed web page in the recirculating list when add to rec list button 156 is selected.

The location of a web page which is displayed by graphical user interface 152 is added to a predetermined location within the recirculating list when add to rec list button 156 is selected. It is preferred that selection of add to rec list places the newly added URL in the bottom position of the recirculating list.

Alternately, a URL which is located in a file folder (not shown) within bookmark pulldown menu 128 can be transferred to recirculating list via selecting dragging and dropping a URL into the recirculating folder. Specially, the URL could be added at a specific location in the recirculation illustrated in FIG. 5. File management operations as is described above are well known by those skilled in the art and variations for adding and removing URLs to and from the recirculating list would not part from the scope of the present invention.

In the embodiment illustrated in FIG. 6, it is preferred that the selectable URL from the recirculating list is always displayed in an active window, possibly on toolbar 158. To scroll URLs through active window 144 a user would place pointing device 126 on scroll button 142 and select scroll button 142. The user can circulate the recirculating list utilizing scroll button 142 until a desired URL address becomes available in active window 144, then the user can move pointing device 126 to select button 140 and again depresses a button or click on the selection. The system proceeds to retrieve data from the selectable URL address which is present in active window 144. Alternately, select button 140 is not necessary. An alternate method to select the active URL is to point and click directly on active window 144. This method eliminates the requirement for select button 140.

Selection of active window 144 would then prompt the system to retrieve data at the URL location displayed in active window 144. It is preferred that auto circulation of another URL address into active window 144 is then achieved after selection of an active URL. In an alternate embodiment, menu items within bookmark pulldown menu 128 of FIG. 6 could be placed on toolbar 158.

The present invention has several benefits. It retains current behavior and user interaction with toolbars and menu bars. The single user input of a menu item or a toolbar icon extends the functionality of the browser GUI without increasing its visual complexity. Particularly, the utilization of a recirculating list allows the user to quickly and easily complete repetitive tasks. The present invention avoids frequent lengthy searches for commonly utilized selections which are not visible or displayed in a operational mode.

After creation of a recirculating list, a simple click upon a toolbar button will implement retrieval of the location corresponding of the selectable URL. The present invention eliminates hunting and pecking for buried menu items and reduces the time and effort required for accessing frequently utilized tools. The present invention utilizes a simple user input to create more efficient access to network location.

In FIGS. 5 and 6, it is important to understand the distinction between the selectable URL of the recirculating list, displayed in the active window, which is capable of being selected and the actual URL address 122 which is the address of the resource presently on display in a browser. The actual address 122 is the address of the currently displayed web page. Actual address 122 is typically present in the upper left hand of the display and is identified by the word "location" or "address". It is preferred that the selectable URL in the recirculating list is distinctly labeled such that a user will not confuse the addresses with one another.

In another embodiment, a parent could place desirable address locations for children in the recirculating list, thereby censoring morally unacceptable information from a child whom is utilizing the internet. Additionally, the censorship could include passwords and other controls well known by those skilled in the art, to allocate specific recirculating lists to specific individuals.

Figure 7:
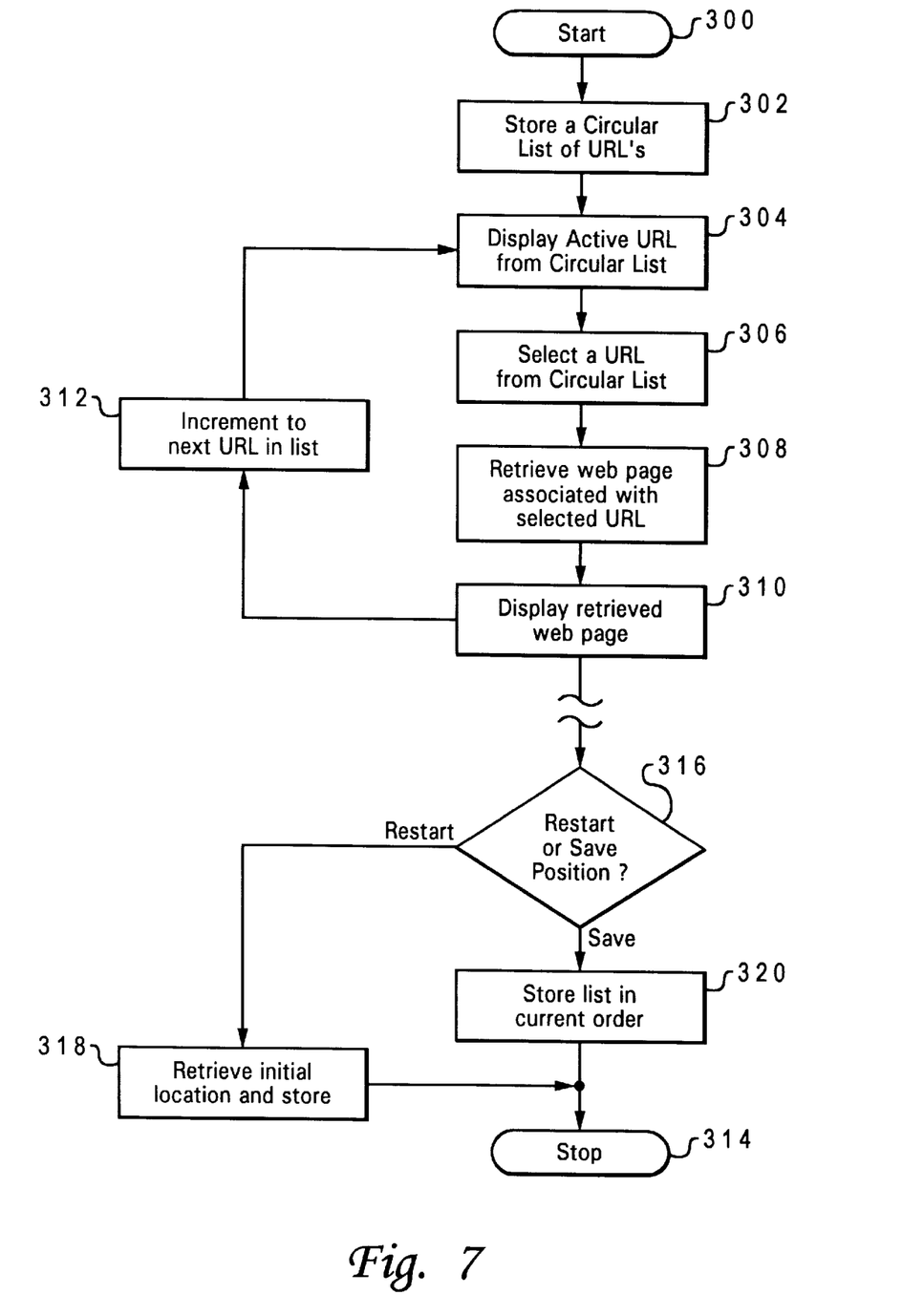
FIG. 7 depicts a high level flowchart of operations illustrative of a method for allowing users to customize a recirculating list and access the recirculating list in accordance with a preferred embodiment of the present invention.

Referring to FIG. 7 a high level flow diagram of a method for creating and utilizing a recirculating list of URLs in accordance with the present invention is illustrated. The method begins at block 300 and proceeds to block 302. In block 302 a list of URLs are stored in response to user input. The list is arranged in circular fashion such that, a continuous uninterrupted presentation of address in the list are sequentially rotated and displayed. Many different methods could be utilized to add URLs to the list, such as selecting an add bookmark menu item when a web site is displayed. Alternately, a user could open an existing bookmark folder and remove a URL address from the folder and place the removed URL address into the recirculating list. Additionally, URL locations could be entered by loading locations via any memory media or manually entering a URL address.

Next as in block 304, the selectable URL from the recirculating list is displayed to the user, preferably, via a graphical user interface. In accordance with block 306, a single URL can be selected from the recirculating list. In block 308, the web page associated with the selected URL is retrieved by a application program or a browser. Next, the retrieved web page is displayed to the user as in block 310. The selectable URL from the recirculating list is then automatically iterated and the next selectable URL in the recirculating list moves to the top of the list as in block 312. The updated selectable URL is then displayed as in block 304.

In a preferred embodiment, at any time a user command to terminate the current session prompts the user as in block 316. The user is prompted to indicate whether upon the next user session, the user would prefer to start at the top of the list, or to start where the user has left off in the recirculating list as of the time of termination.

If the user desires the top of the list for the next session, the initial location is retrieved and stored as in block 318. If the user requests to start the next session at the address location in the list where the user is at currently, the location in the current order is stored such that the user can resume at the address in the recirculation list where the last session terminated as in block 320. In response to inactivity or a user selection to quit the process, the method can end at any time as in block 314.

While the invention has been particularly shown and described with reference to a preferred embodiment, it will be understood by those skilled in the art that various changes in form and detail may be made therein without departing from the spirit and scope of the invention.

What is claimed is:

1. An improved method for selecting and retrieving frequently utilized data associated with network locations within a computer network, comprising the steps of:
   storing identifiers for frequently utilized network locations in a recirculating list, such that said recirculating list provides said identifiers with a sequential order;
   designating one of said identifiers as a next network location;
   displaying said identifier for said next network location in a user interface;
   thereafter, receiving a single user input that activates a mechanism for automatically accessing said next network location identified by said identifier displayed in said user interface; and
   in response to receiving said single user input:
      automatically retrieving data from said next network location; and
      automatically circulating said recirculating list according to said sequential order to cause a successive one of said identifiers to be displayed as said next network location, such that a user may retrieve data from a succession of network locations according to said sequential order of said recirculating list by repeatedly providing said single user input.

2. The method of claim 1, further comprising the step of accessing a folder containing said recirculating list.

3. The method of claim 1, further comprising the step of editing said recirculating list to modify said identifiers in said recirculating list.

4. The method of claim 1, wherein:
said user interface comprises a user interface of a network browser; and
said method further comprises:
   storing said identifier for said next network location; and
   after said network browser has been terminated and re-initiated, automatically displaying said stored identifier.

5. The method of claim 1, wherein:
said user interface comprises a user interface of a network browser; and
said method further comprises:
   receiving user input designating one of said identifiers in said recirculating list as a default next network location;
   storing said identifier for said default next network location; and
   after said network browser has been terminated and re-initiated, automatically displaying said stored identifier.

6. The method of claim 1, wherein:
said step of displaying said identifier for said next network location comprises displaying a selectable object in said user interface; and
said step of receiving a user input comprises detecting that a user has selected said selectable object.

7. The method of claim 6, wherein:
said user input comprises a first user input; and
said method further comprises responding to a second selection of said selectable object by automatically retrieving data associated with said successive one of said identifiers which was circulated to be displayed as said next network location in response to said first user input.

8. The method of claim 6, wherein:
said user interface comprises a graphical user interface (GUI) window generated by a network browser;
said steps of displaying said identifier for said next network location and said selectable object comprise displaying said identifier for said next network location and said selectable object in said GUI window; and
said step of detecting that a user has selected said selectable object comprises detecting that said user has utilized a pointing device to click on said selectable object.

9. The method of claim 8, wherein:
said selectable object is displayed in said graphical user interface (GUI) window as button labeled "next";
said identifier for said next network location is displayed in said GUI window as a universal resource locator (URL); and
said URL and said button labeled "next" are displayed within said GUI window substantially continuously, such that said URL provides a substantially permanent visual indication of the network location to be retrieved in response to selection of said button labeled "next," whereby a user who is viewing data from a current location may retrieve data from said URL with a single input action selecting said button labeled "next".

10. A program product for selecting and retrieving frequently utilized data associated with network locations within a computer network, said program product comprising:
   list logic that stores identifiers for frequently utilized network locations in a recirculation list, such that said recirculating list provides said identifiers with a sequential order;
   designation logic that designates one of said identifiers as a next network location;
   display logic that displays said identifier for said next network location in a user interface;

input logic which receives a single user input that activates a mechanism for automatically accessing said next network location identified by said identifier displayed in said user interface;

retrieval logic that automatically retrieves data from said next network location in response to said single user input;

circulation logic that automatically circulates said recirculating list, in response to said single user input according to said sequential order to cause a successive one of said identifiers to be displayed as said next network location, such that a user may retrieve data from a succession of network locations according to said sequential order of said recirculating list by repeatedly providing said single user input; and a computer usable medium encoding said list logic, said designation logic, said display logic, said input logic, said retrieval logic, and said circulation logic.

11. The program product of claim 10, wherein said computer usable medium also encodes a list indicator that displays a folder containing said recirculating list in response to an edit command.

12. The program product of claim 10, wherein said computer usable medium also encodes a list editor for modifying said identifiers in said recirculating list.

13. The program product of claim 10, wherein:

said user interface comprises a user interface of a network browser; and said computer usable medium also encodes a state preserver that saves said identifier for said next network location, such that when said network browser is terminated and then re-initiated, said display logic displays said saved identifier.

14. The program product of claim 10, wherein:

said user interface comprises a user interface of a network browser;

said computer usable medium also encodes preferences logic that receives user input designating one of said identifiers in said recirculating list as a default next network location and that saves said identifier of said default network location, such that when said network browser is terminated and then re-initiated, said display logic displays said saved identifier.

15. The program product of claim 10, wherein:

said display logic displays a selectable object associated with said identifier for said next network location in said user interface; and said single user input comprises a user selection of said selectable object.

16. The program product of claim 15, wherein:

said user input comprises a first user input; and said retrieval logic responds to a second selection of said selectable object by automatically retrieving data associated with said successive one of said identifiers which was circulated to be displayed as said next network location in response to said first user input.

17. The program product of claim 15, wherein:

said user interface comprises a graphical user interface (GUI) window generated by a network browser;

said display logic displays said identifier for said next network location and said selectable object in said GUI window; and said single user input comprises input from a pointing device indicating that a user has clicked on said selectable object.

18. The program product of claim 17, wherein:

said display logic displays said selectable object in said graphical user interface (GUI) window as button labeled "next";

said display logic displays said identifier for said next network location in said GUI window as a universal resource locator (URL); and said URL and said button labeled "next" are displayed within said GUI window substantially continuously, such that said URL provides a substantially permanent visual indication of the network location to be retrieved in response to selection of said button labeled "next", whereby a user who is viewing data from a current location may retrieve data from said URL with a single input action selecting said button labeled "next".

* * * * *